United States Patent [19]

Jaffe et al.

[11] Patent Number: 5,458,437
[45] Date of Patent: Oct. 17, 1995

[54] EXTRACTION OF NON-IONIC ORGANIC POLLUTANTS

[75] Inventors: Peter R. Jaffe, Princeton, N.J.; Jae W. Park, Lansing, Mich.

[73] Assignee: Trustees of Princeton University, Princeton, N.J.

[21] Appl. No.: 212,245

[22] Filed: Mar. 14, 1994

[51] Int. Cl.$^6$ .................................................... B09B 3/00
[52] U.S. Cl. ............................................ 405/128; 405/258
[58] Field of Search .......................... 405/52, 128, 129, 405/258, 263; 210/747; 588/249, 250

[56] References Cited

U.S. PATENT DOCUMENTS

| | | | |
|---|---|---|---|
| 4,993,873 | 2/1991 | Tippmer | 405/128 |
| 5,024,770 | 6/1991 | Boyd et al. | 210/747 |

OTHER PUBLICATIONS

Development of a Sorbent for Removal of Nonionic Pollutants from Water Jae–Woo Park and Peter R. Jaffe *Environmental Engineering* 1991 pp. 248–253.
Comparison of Tetrachloromethane Sorption to an Alkylammonium Clay and an Alkyldiammonium Clay by James A. Smith and Peter R. Jaffe *Environmental Science & Technology*, vol. 25, 1991 pp. 2054–2058.
Separation of Hydrophohic Organic Compounds from Wastewater Using Surfactant Aggregates on Alumina Particles—K. T. Valsaraj *Wat. Sci. Tech.* vol. 26, No. 5–6, pp. 1213–1220, 1992.
Removal of Phosphate From Waters By Precipitation and High Gradient Magnetic Separation by A. M. H. Shaikh and S. G. Dixit, *Wat. Res.* vol. 26, No. 6, pp. 845–852.
Surfactant Based Treatment of Aqueous Process Streams by John F. Scamehorn and Jeffrey H. Harwell.
Partitioning of Hydrophic Nonpolar Volatile Organics between the Aqueous and Surfactant Aggregate Phases on Alumina by K. T. Valsaraj *Separation Science and Technology* 24(14) pp. 1191–1205, 1989.
Sorption Characteristics of Organic Compounds on Hexadecyltrimethylammonium–Smectite by Stephen A. Boyd, Max M. Mortland and Cary T. Chiou *Soil Sci. Am. J.* (1988) pp. 652–657.
A Model for Anionic Surfactant Sorption by Dominic M. DiToro, Laura J. Dodge and Vincent C. Hand *Environ. Sci. Technol.* vol. 24, No. 7, 1990 pp. 1013–1019.
Structure–Activity Relationships for Sorption of Linear Alkybenzenesulfonates by Vincent C. Hand and Glenwood K. Williams *Environ. Sci. Technol.* vol. 21, 1987 pp. 370–373.
Factors Affecting Surfactant Performance in Groundwater Remediation Applications by Jeffrey H. Harwell.

*Primary Examiner*—David H. Corbin
*Attorney, Agent, or Firm*—Mathews, Woodbridge & Collins

[57] ABSTRACT

Non-ionic pollutants are removed from the soil by contacting the soil with a mixture of a particulate material having an anionic surfactant absorbed to a magnetic oxide. The surfactant complexes through the anionic charge to the magnetic particle and the non-ionic pollutants partitions into the sorbed surfactant. The particulate material including the surfactant and pollutant are magnetically removed from the soil. A typical embodiment utilizes ferric ferrous oxide and alkyl lauryl polyoxycarboxylate to remove polychlorinated biphenyls from soil.

12 Claims, No Drawings

EXTRACTION OF NON-IONIC ORGANIC POLLUTANTS

BACKGROUND OF THE INVENTION

1. Field of the Invention

The present invention relates to extraction of non-ionic organic pollutants absorbed on the surface of a substrate.

2. Description of the Related Art

Non-ionic organic contaminants in the subsurface are absorbed onto naturally occurring organic materials in the soil. Strongly absorbed contaminants are difficult to remove by bioremediation or conventional pump and treat methods. It is desirable to provide an economical and feasible solution for removing absorbed contaminants to reduce environmental risks of soil contamination.

The absorption of surfactants into soil is well documented. (Hand, V. C., and Williams, G. K. "Structure-activity Relationships for Sorption of Linear Alkylbenzenesulfonates", Environ. Sci. Technol., 21(4), 370–373 (1987); Di Toro, D. M., Dodge, L. J., and Hand, V. C. "A Model for Anionic Surfactant Sorption" Environ. Sci. Technol., 24(7), 1013–1020 (1990); Harwell, J. H. "Factors Affecting Surfactant Performance in Groundwater Remediation Applications", Transport and Remediation of Subsurface Contaminants, Sabatini, D. A. and Knox, D. A., eds., ACS Symposium Series 491, American Chemical Society, Washington, DC, 124–132 (1992).

The absorption of non-ionic organic compounds from water to an absorbed surfactant phase has been demonstrated. (Boyd, S. A., Mortland, M. M., and Chiou, C. T. "Sorption Characteristics of Organic Compounds on Hexadecyltrimethylammonium-Smectite" Soil Sci. Soc. Am. J., 52, 652–657 (1988); Valsaraj, K. T. "Partitioning of Hydrophobic Nonpolar Volatile Organics Between the Aqueous and Surfactant Aggregate Phases on Alumina" Sep. Sci. Technol., 24(14), 1191–1205 (1989); Smith, J. A., Jaffe, P. R., and Chiou, C. T. "Effect of Ten Quaternary Ammonium Cations on Tetrachloromethane Sorption to Clay from Water" Environ. Sci. Technol., 24(8), 1167–1172 (1990)).

Efforts directed to the removal of contaminants from water have included utilization of high gradient magnetic separation (HGMS) techniques (Shaikh, A. M. H., and Dixit, S. G. "Removal of Phosphate from Waters by Precipitation and High Gradient Magnetic Separation" Wat. Res., 26(6), 845–852 (1992)). This technique involves precipitation with an appropriate reagent followed by heterocoagulation with a magnetic seed material and removal of the particle aggregate using HGMS.

Moreover, it is known that oxides can be used for the treatment of water contaminated with non-ionic organic compounds. (Scamehorn, J. F., and Harwell, J. H. "Surfactant-based Treatment of Aqueous Streams" Surfactants in Chemical/process Engineering, Wasan, D. T., Ginn, M. E., and Shah, D. O. eds., Marcel Dekker, New York, Vol. I, Chapter 3 (1988); Valsaraj, K. T. "Separation of Hydrophobic Organic Compounds from Wastewater using Surfactant Aggregates on Alumina Particles" Wat. Sci. Tech., 26(5–6), 1213–1220 (1992); Park, J. -W., and Jaffe, P. R. "Development of a Sorbent for Removal of Non-ionic Pollutants from Water" Environmental Engineering: Proceedings of the 1991 Specialty Conference, Am. Soc. Civ. Eng., 248–253 (1991)). Oxide particles having a positively charged surface at the pH of typical natural waters absorb anionic surfactants from solution onto their surface. The resultant oxide has a hydrophophobic surface into which non-ionic organic pollutants will partition.

DETAILED DESCRIPTION OF THE INVENTION

The present invention relates to a method of separating a non-ionic organic pollutant of low water solubility absorbed on the surface of a substrate which involves the steps of (i) contacting the substrate in an aqueous medium with a mixture of a particulate material containing a substantial amount of a magnetic oxide or magnetic sulfide and an anionic surfactant to cause the anionic surfactant to complex or absorb through its anionic charge to the particulate material, (ii) maintaining the contact for a sufficient amount of time to permit partitioning of the pollutant between the substrate and the surfactant, and (iii) separating the particulate material having the surfactant and pollutant absorbed thereto magnetically from the substrate. The above method provides for the easy removal of pollutants from a substrate.

The first step is to contact a substrate contaminated with non-ionic organic pollutants with a mixture of a magnetic oxide or magnetic sulfide and an anionic surfactant. The non-ionic organic pollutant is absorbed on the surface of the substrate. Preferably contact is made in an aqueous medium. Representative of non-ionic organic pollutants are aromatic polyaromatic hydrocarbons, chlorinated phenyls, chlorinated phenols, chlorinated aromatic hydrocarbons, polychlorinated biphenyls, mixtures thereof and the like. Examples of aromatic hydrocarbons are benzene, toluene and the like. Polyaromatic hydrocarbons include phenanthrene, naphthalene, and the like. Polychlorinated biphenyls are compounds having the formula $C_{12} H_{10-n} X_n$, where X is a chlorine atom and n is greater than 1.

Preferably, the non-ionic organic pollutant has low water solubility for enhancing the transfer of the pollutant to the particulate material rather than dissolving in the aqueous medium. Most preferably the pollutant has an octanol water partition coefficient ($k_{ow}$) of greater than $10^3$.

Typical substrates which can be used in the present method are soil, top soil, sediment, silt, clay, pebbles and sand. It will be appreciated that other substrates can be used with the teachings of the present invention.

The oxide or sulfide is treated with an anionic surfactant to absorb the anionic surfactant on the surface of the oxide. Oxides typically have a positively charged surface at the pH of an aqueous medium. Preferably, the pH of the aqueous medium is adjusted to be in the range of about 3.0 to about 8.0. Positively charged oxide particles attract the anionic surfactant for complexing the surfactant onto the oxide.

Any magnetic oxide or magnetic sulfide having a surface charge can be used in the present invention. Typical magnetic oxides are ferric ferrous oxide, ferric oxide, ferric hydroxy oxide, titano ferric ferrous oxide and titano ferric oxide. Representative of magnetic sulfides are ferric sulfides. Preferred magnetic oxides are ferric oxide and ferric ferrous oxide. The magnetic oxides can be treated with stabilizing agents, such as cobalt. The oxide or sulfide to soil ratio is typically between about 0.1% to about 25% weight percent oxide to soil. Preferably the oxide to soil ratio is about 5% by weight of oxide to soil. The particle size of the magnetic oxide or magnetic sulfide is preferably in the range of 0.01 μm to 5 μm.

Representative anionic surfactants that can be used in the present invention include dodecylbenzene sulfonic acid, dodecylsulfate, alkyl lauryl polyoxycarboxylate (Eg. Emcol CNP-60, manufactured by Witco), phosphate ester (Eg. Emphos CS-121, CS-131, CS-138, CS-141, CS-341, manufactured by Witco), alkyl ether sulfate (Eg. Witcolate, manufactured by Witco), sodium lauryl sulfate and the like. Additional examples of anionic surfactants are sulfosuccinic acid 1,4 bis (2-ethylhexyl) ester sodium salt, sulfosuccinic acid dipentyl ester sodium salt, alkyl sodium sulfates, and the like. A preferred surfactant is alkyl lauryl polyoxycarboxylate.

The second step in the separation method involves partitioning of the pollutant between the substrate, water and the surfactant sorbed into the magnetic particle. The contact time between the pollutant and the surfactant must be sufficient to cause the pollutant to repartition from the substrate to the surfactant. Preferably the pollutant and substrate are contacted until equilibrium is reached. Mechanical means can be used during contact for increasing the amount of organic pollutant that is contacted with the surfactant sorbed onto the magnetic particle. For example, the mechanical means can include mixing, stirring or tumbling.

Preferably the surfactant concentrations remaining in solution are lower than the critical micelle concentration (CMC) for preventing formation of a micellar phase. A micellar phase enhances the solubility of the non-ionic organic pollutant in solution which decreases the fraction of pollutant absorbed on the surfactant sorbed to the magnetic particles. The surfactant used preferably has a greater affinity for the magnetic particle than for the soil.

The third step in the method involves separation of the substrate from the surfactant together with the pollutant absorbed thereto. The separation step of the present method uses magnetic means for magnetically attracting the magnetic oxide or magnetic sulfide and absorbed surfactant from the solution. The magnetic means can be of sufficient strength for attracting the oxide.

One embodiment of the present invention adds a supplemental amount of the magnetic oxide or magnetic sulfide to the aqueous medium after the pollutant has been removed in the third step of the above described method. After the supplemental amount of magnetic oxide is added and sufficient contact time has been provided for the remaining surfactant to sorb onto the oxide and the pollutant to partition into the sorbed surfactant, magnetic means are used for magnetically attracting the magnetic oxide or magnetic sulfide and absorbed surfactant complexed to the pollutant from the solution.

In one embodiment after the third step is completed, the pollutant can be extracted for the magnetic particle in a fourth step by using an organic solvent or a base solution with a pH above the zero point of charge of the magnetic particle. This allows for re-use of the materials.

The following examples are provided to illustrate the nature of the present invention and are not to be construed as limiting the scope thereof, which scope is specifically defined by the appended claims.

EXAMPLE 1

Phenanthrene (0.058 mg) is added to soil (10 g) and incubated in a tumbler for 24 hours. Soil contaminated with phenanthrene (10 g) is placed in a vessel with 54 mL of water. Ferrous ferric oxide (1 g, approximately having a particle size of 20% of 5 µm, 60% of 2–5 µm and 20% of < 2 µm) and 2 mL of alkyl lauryl polycarboxylate in an aqueous solution (10.68 g/L) are added to the vessel, which is mixed for 6 hours the phenanthrene partitioned to the surfactant is removed using a glass shielded magnet. To extract the phenanthrene from the removed oxide, 56 ml of octanol is placed in a vessel with the oxide and mixed for 4 hours in a rotator.

EXAMPLE 2

Phenanthrene (5 mg) is added to soil (10 g) and incubated for 24 hours. Contaminated soil is placed in a vessel with 54 mL of water and ferric oxide (2 g, approximately having a particle size of 98.7% <5 µm and 1.3%<1 µm) and 2 mL of an aqueous solution of dodecylbenzene sulfonic acid (DDBS) (10.7 g/L) is added to the vessel. After 6 hours the phenanthrene partitioned to DDBS is removed using a glass shielded magnet.

EXAMPLE 3

10 g soil contaminated with polychlorinated biphenyls (5.74 mg/kg of soil) is incubated for 24 hours. The contaminated soil was placed in a vessel with 54 mL of water. Ferrous ferric oxide (1 g) and 2 mL of alkyl lauryl polycarboxylate in an aqueous solution (10.68 g/L) are added to the vessel, which is mixed for 6 hours. The polychlorinate biphenyls and surfactant are removed using a glass shielded magnet.

EXAMPLE 4

After extraction of phenanthrene in Example 1, ferrous ferric oxide (1 g) is added to the vessel. After six hours the phenanthrene partitioned to the surfactant absorbed on the ferrous ferric oxide are removed using a glass shielded magnet.

We claim:
1. The method of separating a non-ionic organic pollutant of low water solubility adsorbed on the surface of a substrate which comprises:
   (i) bringing the substrate into intimate contact in an aqueous medium with a mixture of (a) particulate material containing a substantial amount of magnetic oxide or magnetic sulfide and (b) an anionic surfactant operable to complex through its anionic charge to the particulate material;
   (ii) maintaining the contact for a period of time sufficient to permit substantial partitioning of said pollutant between the substrate and the surfactant; and
   (iii) separating the particulate material, together with surfactant and pollutant adsorbed thereto, magnetically from the substrate.
2. The method of claim 1 wherein the pollutant is a polyaromatic hydrocarbon.
3. The method of claim 1 wherein the pollutant is a polychlorinated biphenyl.
4. The method of claim 1 wherein the pollutant has a octanol water partition coefficient of greater than $10^3$.
5. The method of claim 1 wherein the magnetic oxide is ferric ferrous oxide or ferric oxide.
6. The method of claim 1 wherein the anionic surfactant is alkyl lauryl polyoxycarboxylate.
7. The method of claim 1 wherein the anionic surfactant is dodecylbenzene sulfonic acid or dodecylsulfate.
8. The method of claim 1 wherein the amount of oxide is from about 0.1% to about 25% by weight of oxide to the substrate.
9. The method of claim 1 wherein the substrate is soil.

10. The method of claim 1 further comprising the steps of:
(iv) adding a supplemental amount of said magnetic oxide or magnetic sulfide to said aqueous medium, after step (iii) and,
(v) repeating step (iii).

11. The method of claim 1 wherein said step (ii) of maintaining the contact comprises mechanical means.

12. The method of claim 1 further comprising the step of:
(iv) removing said pollutant from said separated particulate material.

* * * * *